US009941826B2

(12) United States Patent
Kaidu et al.

(10) Patent No.: US 9,941,826 B2
(45) Date of Patent: Apr. 10, 2018

(54) MOTOR DRIVE CONTROL DEVICE (71) Applicant: MINEBEA CO., LTD., Kitasaku-gun, Nagano (JP)

(72) Inventors: Hiroyuki Kaidu, Iwata (JP); Yuji Omura, Shizuoka (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 15/359,459

(22) Filed: Nov. 22, 2016

(65) Prior Publication Data

US 2017/0155348 A1   Jun. 1, 2017

(30) Foreign Application Priority Data

Nov. 27, 2015   (JP) ................................. 2015-231983

(51) Int. Cl.
| | | |
|---|---|---|
| H02P 3/00 | (2006.01) |
| H02P 23/12 | (2006.01) |
| H02P 6/182 | (2016.01) |
| H02P 27/06 | (2006.01) |
| H02P 6/15 | (2016.01) |
| H02P 6/17 | (2016.01) |

(52) U.S. Cl.
CPC .............. *H02P 6/182* (2013.01); *H02P 6/157* (2016.02); *H02P 6/17* (2016.02); *H02P 27/06* (2013.01)

(58) Field of Classification Search
CPC .......... H02P 6/153; H02P 6/182; H02P 6/157; H02P 6/17; H02P 27/06; H02P 29/10
USPC .................... 318/400.14, 440, 459
See application file for complete search history.

(56) References Cited

U.S. PATENT DOCUMENTS

| | | | | |
|---|---|---|---|---|
| 2006/0170383 A1* | 8/2006 | Narumi | ................... | H02P 6/182 318/400.04 |
| 2007/0132409 A1 | 6/2007 | Wada et al. | | |
| 2008/0252240 A1* | 10/2008 | Sugie | ........................ | H02P 6/15 318/400.06 |
| 2009/0153086 A1* | 6/2009 | Narumi | ................... | H02P 6/18 318/400.35 |

(Continued)

FOREIGN PATENT DOCUMENTS

| | | |
|---|---|---|
| JP | H08-191589 A | 7/1996 |
| JP | 2001-231287 A | 8/2001 |

(Continued)

OTHER PUBLICATIONS

Office Action dated Jan. 23, 2018, issued in the corresponding Japanese Patent Application 2015-231983.

*Primary Examiner* — Eduardo Colon Santana
*Assistant Examiner* — Gabriel Agared
(74) *Attorney, Agent, or Firm* — Carrier Blackman & Associates, P.C.; Joseph P. Carrier; Jeffrey T. Gedeon (57) ABSTRACT

A motor drive control device drives a motor including a plurality of phase coils and a rotor rotatably supported with respect to the plurality of phase coils, and the motor drive control device includes a controller, which generates a drive control signal; a motor driver, which outputs a drive signal to each of the phase coils of the motor, based on the drive control signal; and a back-electromotive-voltage detector, which is connected to each of the phase coils and includes resistive voltage dividing circuits having respectively different voltage-dividing ratios, wherein the back-electromotive-voltage detector detects a rotational position of a rotor for sensorless driving by using the resistive voltage dividing circuits.

4 Claims, 5 Drawing Sheets

(56) References Cited

U.S. PATENT DOCUMENTS

| | | | | |
|---|---|---|---|---|
| 2014/0210379 A1* | 7/2014 | Kato | ................... | H02P 6/15 |
| | | | | 318/139 |
| 2015/0002061 A1* | 1/2015 | Hatakeyama | ............ | H02P 6/18 |
| | | | | 318/400.06 |
| 2015/0318808 A1* | 11/2015 | Okubo | ................... | H02K 29/03 |
| | | | | 318/400.02 |

FOREIGN PATENT DOCUMENTS

| | | |
|---|---|---|
| JP | 2007-159353 A | 6/2007 |
| JP | 2008-301550 A | 12/2008 |

\* cited by examiner

MOTOR DRIVE CONTROL DEVICE

CROSS-REFERENCE TO RELATED APPLICATION

This application claims priority from Japanese Patent Application No. 2015-231983 filed on Nov. 27, 2015, the entire subject matter of which is incorporated herein by reference.

TECHNICAL FIELD

This disclosure relates to a motor drive control device.

BACKGROUND

In a motor driving control system used to a DC brushless motor, there are widely used two systems of a sensor driving system which uses a position sensor such as a hall sensor and a sensorless driving system which generates rotor position information from an induced voltage generated in a motor coil. A motor drive control device not provided with the position sensor generates a phase signal (pulse signal) by comparing between the induced voltage which emerges at the motor terminal in an open section (non-energization phase) and a reference voltage (equivalent neutral point electrical potential) with a comparator, and detects a rotational position of the rotor based on the phase signal.

A motor driving device is disclosed in JP-A-2008-301550 which outputs a drive selection signal for activating a motor by sensor driving and switching the motor to sensorless driving when the number of revolutions increases, and in which a drive switching unit continues the sensor driving even after the sensorless driving is selected and switches the excitation sequence to the sensorless drive while avoiding a shift period defined between an edge of the sensor signal and an edge of a zero-cross signal to be used as a reference instead of the edge of the sensor signal.

SUMMARY

However, in three-phase sensorless driving, the motor control device disclosed in JP-A-2008-301550 has a problem that when a zero-cross reference voltage and the phase voltage come to be a non-cross state, a step-out occurs. For example, the step-out is likely to occur at the time of high-speed rotation of about 30000 revolutions per one minute.

Such a problem can be avoided by lowering the zero-cross reference voltage and advancing the angle. However, when the zero-cross reference voltage is lowered, such as a start-up hardly occurs or the low-speed rotation is hardly maintained occurs.

This disclosure is to provide a motor drive control device, in which a step-out hardly occurs even in a high-speed rotation and a low-speed rotation is realized.

A motor drive control device according to this disclosure drives a motor including a plurality of phase coils and a rotor rotatably supported with respect to the plurality of phase coils, and the motor drive control device includes: a controller, which generates a drive control signal; a motor driver, which outputs a drive signal to each of the phase coils of the motor, based on the drive control signal; and a back-electromotive-voltage detector, which is connected to each of the phase coils and includes resistive voltage dividing circuits having respectively different voltage-dividing ratios, wherein the back-electromotive-voltage detector detects a rotational position of a rotor for sensorless driving by using the resistive voltage dividing circuits. Other units will be described in the embodiments.

According to this disclosure, it is possible to provide the motor drive control device, in which the step-out hardly occurs even in the high-speed rotation and the low-speed rotation is realized.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, an embodiment of this disclosure will be described in detail with reference to the accompanying drawings.

Figure 1:
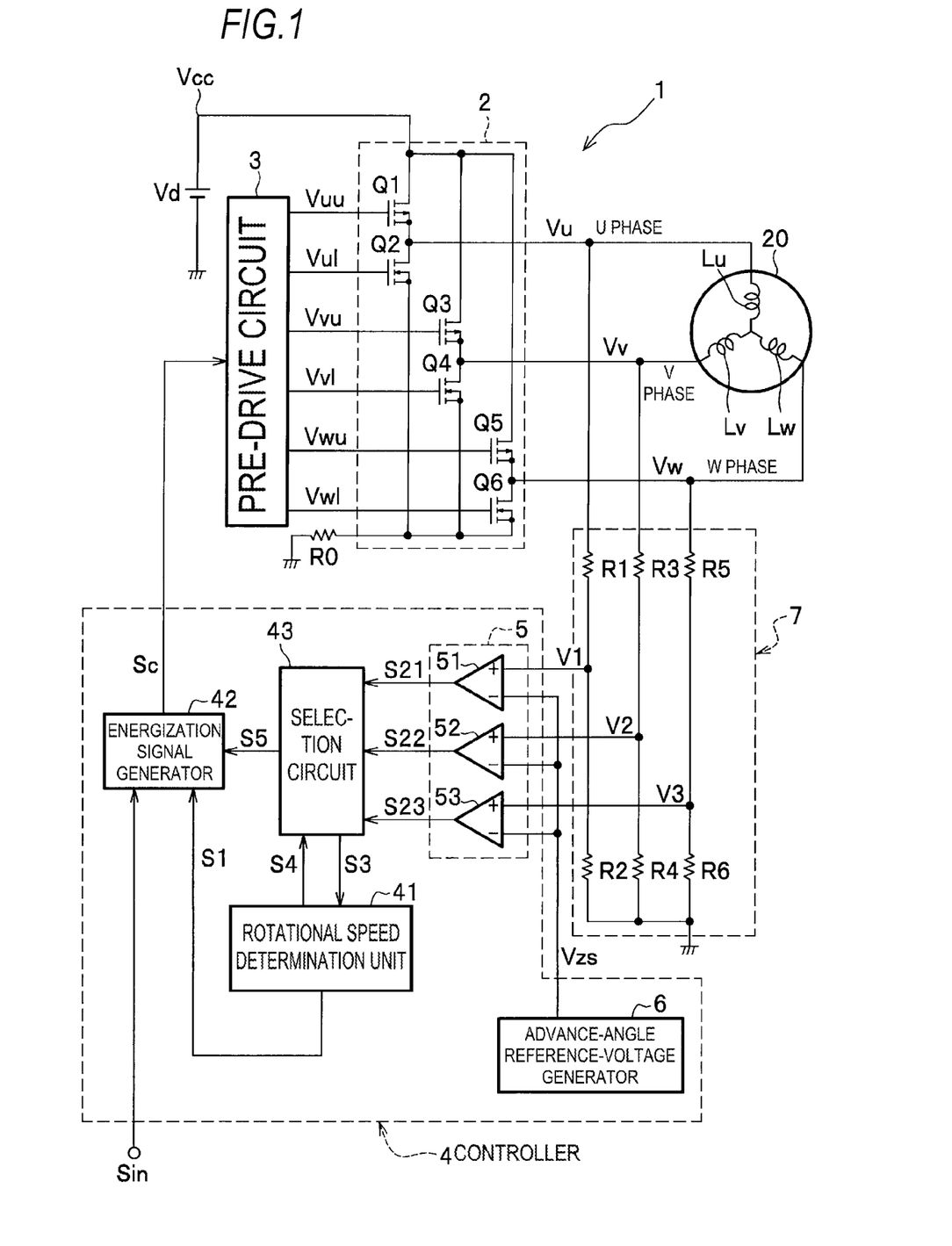
FIG. 1 is a block diagram illustrating a circuit configuration of a motor drive control device according to an embodiment.

FIG. 1 is a block diagram illustrating a circuit configuration of a drive control device 1 of a motor 20 according to the embodiment.

As illustrated in FIG. 1, the motor 20 according to the embodiment is a three-phase brushless DC motor and includes coils Lu, Lv, and Lw of phases and a rotor (not illustrated). One ends of the coils Lu, Lv, and Lw are formed in Y-connection. The other end of the coil Lu is connected to a U phase, the other end of the coil Lv is connected to a V phase, and the other end of the coil Lw is connected to a W phase. A three-phase AC is input to the U phase, the V phase, and the W phase from an inverter circuit 2, whereby the motor 20 is driven to rotate.

The drive control device 1 of the motor 20 (an example of a motor drive control device) includes an inverter circuit 2 that drives the motor 20 and a pre-drive circuit 3 (an example of a motor driver). The drive control device 1 further includes a back-electromotive-voltage detector 7 and a controller 4 that output a drive control signal Sc (to be described below) to the motor driver.

The drive control device 1 is connected to a DC power source Vd and is connected to the motor 20 through three phases of a U-phase wiring, a V-phase wiring, and a W-phase wiring. The drive control device 1 applies a drive voltage to the motor 20, thereby controlling the rotation of the motor 20. An inter-terminal voltage Vu is applied to the U phase. An inter-terminal voltage Vv is applied to the V phase. An inter-terminal voltage Vw is applied to the W phase.

The motor driver is configured by the inverter circuit 2 and the pre-drive circuit 3. The DC power source Vd applies a power supply voltage Vcc to the motor driver, thereby supplying power thereto. The motor driver receives the power from the DC power source Vd and supplies a drive current to the U-phase coil Lu, the V-phase Lv, and the W-phase coil Lw of the motor 20 based on the drive control signal Sc supplied from the controller 4, thereby rotating the rotor. The motor driver drives the motor 20 using a sinusoidal wave driving system.

The inverter circuit 2 (a part of the motor driver) is connected to the DC power source Vd and receives the supply of power. The inverter circuit 2 is connected to the pre-drive circuit 3 (a part of the motor driver) and the phase coils Lu, Lv, and Lw included in the motor 20. The inverter circuit 2 applies a current to the phase coils Lu, Lv, and Lw of the motor 20 based on drive signals Vuu to Vwl of the pre-drive circuit 3.

The inverter circuit 2 includes a U-phase switching leg in which switching elements Q1 and Q2 are connected to each other in series, a V-phase switching leg in which switching elements Q3 and Q4 are connected to each other in series, and a W-phase switching leg in which switching elements Q5 and Q6 are connected to each other in series. For example, these switching elements Q1 to Q6 are field effect transistors (FET). The inverter circuit 2 is connected to the DC power source Vd and is further connected to a resistor R0.

The U-phase switching leg includes the upper-arm-side switching element Q1 and the lower-arm-side switching element Q2. A drain terminal of the switching element Q1 is connected to a positive electrode of the DC power source Vd. A source terminal of the switching element Q1 outputs an AC signal of the U phase and is connected to a drain terminal of the switching element Q2. A source terminal of the switching element Q2 is connected to the ground (a negative electrode of the DC power source Vd) through the resistor R0. A gate terminal of the switching element Q1 and a gate terminal of the switching element Q2 are respectively connected to the pre-drive circuit 3.

The V-phase switching leg includes the upper-arm-side switching element Q3 and the lower-arm-side switching element Q4. A drain terminal of the switching element Q3 is connected to the positive electrode of the DC power source Vd. A source terminal of the switching element Q3 outputs an AC signal of the V phase and is connected to a drain terminal of the switching element Q4. A source terminal of the switching element Q4 is connected to the ground (the negative electrode of the DC power source Vd) through the resistor R0. A gate terminal of the switching element Q3 and a gate terminal of the switching element Q4 are respectively connected to the pre-drive circuit 3.

The W-phase switching leg includes the upper-arm-side switching element Q5 and the lower-arm-side switching element Q6. A drain terminal of the switching element Q5 is connected to the positive electrode of the DC power source Vd. A source terminal of the switching element Q5 outputs an AC signal of the W phase and is connected to a drain terminal of the switching element Q6. A source terminal of the switching element Q6 is connected to the ground (the negative electrode of the DC power source Vd) through the resistor R0. A gate terminal of the switching element Q5 and a gate terminal of the switching element Q6 are respectively connected to the pre-drive circuit 3.

That is, the inverter circuit 2 includes: the upper-arm-side switching elements Q1, Q3, and Q5 respectively connected between the phase coils Lu, Lv, and Lw of the motor 20 and one terminal (positive-electrode terminal) of the DC power source Vd; and the lower-arm-side switching elements Q2, Q4, and Q6 respectively connected between the phase coils Lu, Lv, and Lw and the other terminal (negative-electrode terminal) of the DC power source Vd through the resistor R0.

When power is supplied from the DC power source Vd, and the drive signals Vuu to Vwl are input from the pre-drive circuit 3, the inverter circuit 2 causes three-phase AC currents to flow into the U-phase wiring, the V-phase wiring, and the W-phase wiring of the motor 20.

The pre-drive circuit 3 (a part of the motor driver) forms the motor driver by a combination of with the inverter circuit 2 to be connected, and is connected to the controller 4. The pre-drive circuit 3 includes, for example, six gate drive circuits and generates the drive signals Vuu to Vwl used for driving the inverter circuit 2.

The back-electromotive-voltage detector 7 is connected to the phase coils. The back-electromotive-voltage detector 7 includes resistive voltage dividing circuits having different voltage-dividing ratios, respectively, and detects a rotational position of the rotor for sensorless driving. The back-electromotive-voltage detector 7 is configured such that a voltage-dividing ratio R1/R2 of resistors R1 and R2 being the resistive voltage dividing circuit of the U phase, a voltage-dividing ratio R3/R4 of resistors R3 and R4 being the resistive voltage dividing circuit of the V phase, and a voltage-dividing ratio R5/R6 of resistors R5 and R6 being the resistive voltage dividing circuit of the W phase are different from one another. As an example of a configuration in which the voltage-dividing ratios (R1/R2, R3/R4, and R5/R6) are different from one another, the resistors R1, R3, and R5 have different resistance values, respectively, and the resistors R2, R4, and R6 also have different resistance values, respectively. Thus, the phases have different voltage-dividing ratios, respectively. For example, in the back-electromotive-voltage detector 7, the voltage-dividing ratio R3/R4 of the resistors R3 and R4 of the V phase is higher than the voltage-dividing ratio R1/R2 of the resistors R1 and R2 of the U phase, and the voltage-dividing ratio R5/R6 of the resistors R5 and R6 of the W phase is lower than the voltage-dividing ratio R1/R2 of the resistors R1 and R2 of the U phase.

The controller 4 performs the sensorless driving based on the rotational position of the rotor detected by the back-electromotive-voltage detector 7 and controls to synchronize with the phase having an optimum advance angle depending on a rotational speed. Specifically, the controller 4 switches the synchronized phase to a phase having a further advanced angle as the rotational speed increases. In this case, the rotational speed is determined based on at least one of a winding voltage and a winding current.

The controller 4 includes an advance-angle reference-voltage generator 6 which generates a zero-cross reference voltage Vzs, a back-electromotive-voltage comparator 5 which generates phase signals S21 to S23 of the respective phases due to the cross timing of the zero-cross reference voltage Vzs and a back electromotive voltage of the each phase coil, a rotational speed determination unit 41 which inputs the phase signals of the respective phases and outputs rotational speed information S4, an energization signal generator 42 which generates the drive control signal Sc based on a selection signal S5 output from a selection circuit 43, and the selection circuit 43 which selects and outputs any one of the phase signals S21 to S23 of the respective phases depending on the rotational speed information S4. The controller 4 is included in a microcomputer. Each unit may be realized by software, and the function thereof may be virtually represented.

The back-electromotive-voltage comparator 5 generates the phase signal of the each phase due to the cross timing of the zero-cross reference voltage Vzs and the back electromotive voltages of the each phase coil.

The back-electromotive-voltage comparator 5 includes comparators 51, 52, and 53 of the respective phases. The voltage of a U-phase node is divided by the resistors R1 and R2 of the back-electromotive-voltage detector 7, and thus the U-phase node is connected to one input terminal of the comparator 51. The voltage of a V-phase node is divided by the resistors R3 and R4 of the back-electromotive-voltage detector 7, and thus the V-phase node is connected to one input terminal of the comparator 52. The voltage of a W-phase node is divided by the resistors R5 and R6 of the back-electromotive-voltage detector 7, and thus the W-phase node is connected to one input terminal of the comparator 53. As described above, in the back-electromotive-voltage detector 7, the voltage-dividing ratio R1/R2 of the resistors R1 and R2 of the U phase, the voltage-dividing ratio R3/R4 of the resistors R3 and R4 of the V phase, and the voltage-dividing ratio R5/R6 of the resistors R5 and R6 of the W phase are different from one another. In each of the comparator 51, 52, and 53, the other input terminal is connected to the advance-angle reference-voltage generator 6.

The comparator 51 of the back-electromotive-voltage comparator 5 includes a non-inverted input terminal and an inverted input terminal, and an output terminal. When the applied voltage of the non-inverted input terminal is lower than the applied voltage of the inverted input terminal, the comparator 51 outputs an L-level voltage to the output terminal. When the applied voltage of the non-inverted input terminal exceeds the applied voltage of the inverted input terminal, the comparator 51 outputs an H-level voltage to the output terminal.

A phase voltage V1 obtained by dividing the interterminal voltage Vu corresponding to an induced voltage of the coil Lu is input to the non-inverted input terminal of the comparator 51. The zero-cross reference voltage Vzs is input to the non-inverted input terminal of the comparator 51. The comparator 51 generates the phase signal S21 by comparing the phase voltage V1 with the zero-cross reference voltage Vzs. When the phase voltage V1 has a negative value in comparison with the zero-cross reference voltage Vzs, the level of the phase signal S21 is L. When the phase voltage V1 has a positive value in comparison with the zero-cross reference voltage Vzs, the level of the phase signal S21 is H.

A phase voltage V2 obtained by dividing the interterminal voltage Vv corresponding to an induced voltage of the coil Lv is input to the non-inverted input terminal of the comparator 52. The zero-cross reference voltage Vzs is input to the non-inverted input terminal of the comparator 52. The comparator 52 generates the phase signal S22 by comparing the phase voltage V2 with the zero-cross reference voltage Vzs. When the phase voltage V2 has a negative value in comparison with the zero-cross reference voltage Vzs, the level of the phase signal S22 is L. When the phase voltage V2 has a positive value in comparison with the zero-cross reference voltage Vzs, the level of the phase signal S22 is H.

A phase voltage V3 obtained by dividing the interterminal voltage Vw corresponding to an induced voltage of the coil Lw is input to the non-inverted input terminal of the comparator 53. The zero-cross reference voltage Vzs is input to the non-inverted input terminal of the comparator 53. The comparator 53 generates the phase signal S23 by comparing the phase voltage V3 with the zero-cross reference voltage Vzs. When the phase voltage V3 has a negative value in comparison with the zero-cross reference voltage Vzs, the level of the phase signal S23 is L. When the phase voltage V3 has a positive value in comparison with the zero-cross reference voltage Vzs, the level of the phase signal S23 is H.

In this manner, the comparators 51 to 53 of the back-electromotive-voltage comparator 5 can compare the interterminal voltages Vu, Vv, and Vw corresponding to the phase voltages V1 to V3 with the zero-cross reference voltage Vzs. The back-electromotive-voltage comparator 5 outputs the generated phase signals S21 to S23 to the selection circuit 43.

The advance-angle reference-voltage generator 6 generates the zero-cross reference voltage Vzs which is a predetermined constant voltage.

The rotational speed determination unit 41 inputs the phase signals of the respective phases, and outputs the rotational speed information S4. When any one of the phase voltages V1 to V3 zero-crosses with the zero-cross reference voltage Vzs, the rotational speed determination unit 41 determines the rotational speed of the motor 20.

The energization signal generator 42 generates the drive control signal Sc based on a rotational speed command signal Sin input from outside, a rotational speed determination signal Si input from the rotational speed determination unit 41, and a selection signal S5 (any one of the phase signals S21 to S23) input from the selection circuit 43.

The selection circuit 43 outputs any one of the phase signals (S21 to S23) of the respective phase in response to the rotational speed information S4.

Figure 2:
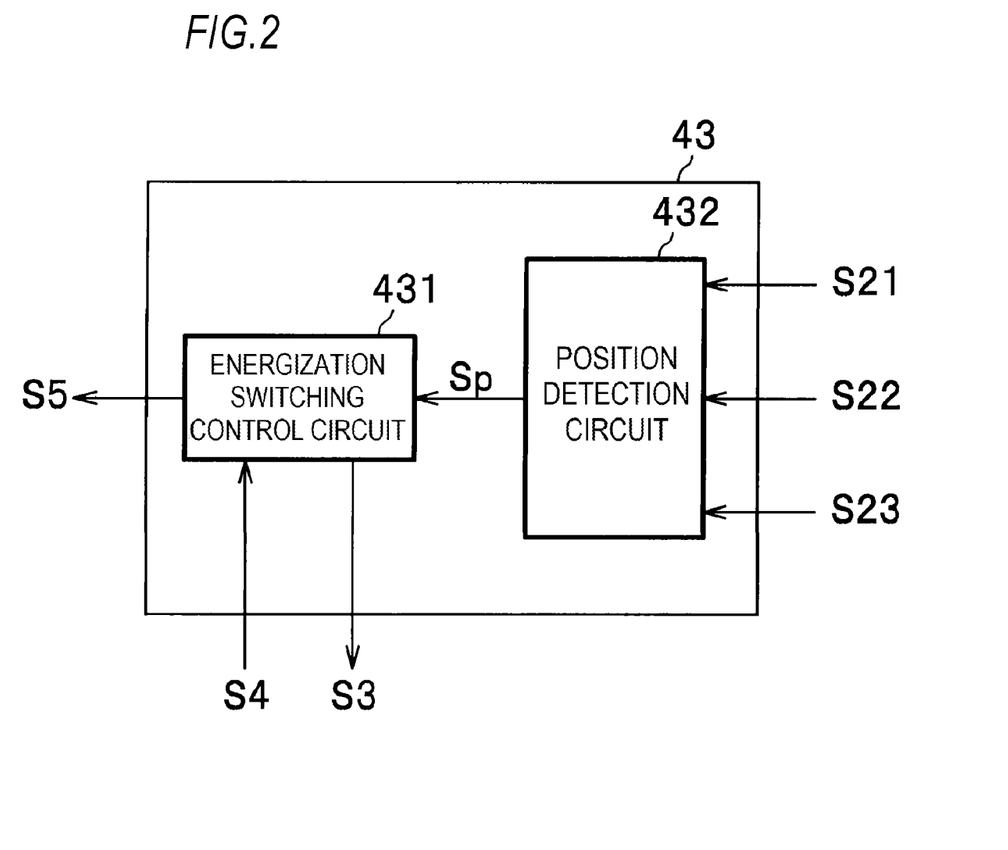
FIG. 2 is a circuit configuration diagram of a selection circuit of a controller of the motor drive control device according to the embodiment.

FIG. 2 is a circuit configuration diagram of the selection circuit 43.

As illustrated in FIG. 2, the selection circuit 43 includes an energization switching control circuit 431 and a position detection circuit 432.

The energization switching control circuit 431 outputs a position detection signal Sp (the phase signals S21 to S23 of the respective phases), which is output from the position detection circuit 432, as a detection signal S3 to the rotational speed determination unit 41, and obtains the rotational speed information S4 from the rotational speed determination unit 41. The energization switching control circuit 431 selects, based on the obtained rotational speed information S4, the position detection signal Sp (the phase signals S21 to S23 of the respective phases) output from the position detection circuit 432, and outputs the selected position detection signal as the selection signal S5.

The position detection circuit 432 generates the position detection signal Sp indicating the rotational position of the rotor, based on the phase signals S21 to S23 of the respective phases generated from the back-electromotive-voltage comparator 5, and outputs the generated signals to the energization switching control circuit 431.

Hereinafter, the description will be given about an operation of the above-described drive control device 1 of the motor 20.

First, the basic idea of this disclosure will be described.

In three-phase sensorless driving according to a comparative example, when the zero-cross reference voltage Vzs and the phase voltage fall into a non-cross state, there is a risk that a step-out occurs at the time of high-speed rotation. When the zero-cross reference voltage Vzs is advanced downward in order to avoid the risk, it becomes difficult to start up, or it is not possible to maintain low-speed rotation.

The present inventors have found a method of performing advance angle/delay angle control with a simple manner without changing the zero-cross reference voltage. That is, this disclosure is configured such that each of the phases has different voltage-dividing resistors so as not to prevent occurrence of step-out under the normal start-up during the three-phase sensorless driving even both at the high-speed rotation and the low-speed rotation. In this way, it is possible to generate three types of winding voltage waveforms after dividing the voltage. That is, when three types of winding voltage waveforms are generated after the voltage-dividing, any one of three types of winding voltage waveforms can be selectively used, and detection of the zero-cross becomes fast or slow without the change of the zero-cross reference voltage. Consequently, this disclosure is applicable to an existing sensorless driving control, and can perform energization switching of the advance angle or energization switching of the delay angle. For example, this disclosure is configured to synchronize with a phase voltage of a phase having the advance angle suitable for the start-up at the time of the start-up, synchronize with a phase voltage of a phase having the advance angle suitable for the high-speed rotation at the time of the high-speed rotation, and synchronize with a phase voltage of a phase suitable for the low-speed rotation at the time of the low-speed rotation. Thus, it is possible to normally start up, and the step-out hardly occurs even at the high speed or the lower speed during the three-phase sensorless driving. The phase to be synchronized is optimally switched depending on the number of revolutions, the voltage, the current, or the like. The detailed description will be made below.

Figure 3:
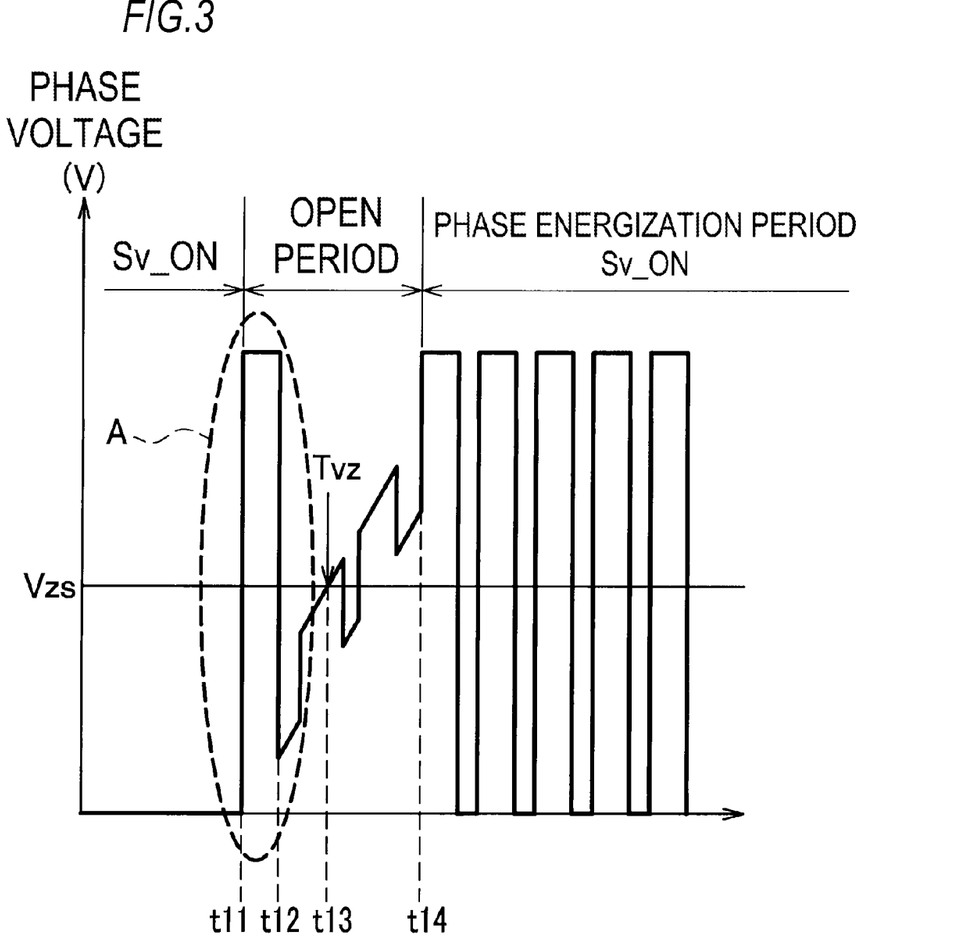
FIG. 3 is a timing chart illustrating a waveform of a phase voltage for explaining a relation between a winding voltage waveform (phase voltage) after voltage-dividing and advance angle/delay angle of the motor drive control device according to the embodiment.

FIG. 3 is a timing chart illustrating a waveform of the phase voltage for explaining a relation between the winding voltage waveform (phase voltage) after the voltage-dividing and the advance angle/delay angle. In FIG. 3, a vertical axis indicates the phase voltage (V). In FIG. 3, a horizontal axis indicates time.

Time t11 represents start timing of an open period 60 degrees. A positive spike voltage is generated in the phase voltage.

Time t12 represents end timing of the positive spike voltage of the phase voltage V1. A spike voltage period ts is a time from the time t11 to the time t12. The phase voltage rises henceforward.

Time t13 represents timing at which the phase voltage V1 crosses the zero-cross reference voltage Vzs for the first time after the spike voltage period ts.

Time t14 represents end timing of the open period 60 degrees and start timing of a phase energization period ($S_V$_ON).

As illustrated in FIG. 3, a point at which the winding voltage waveform after the voltage-dividing intersects a predetermined zero-cross reference voltage Vzs is a zero-cross point Tvz. In the case of FIG. 3, the phase energization period ($S_V$_on) is cut off in the open period 60 degrees, and thus the winding voltage waveform becomes a waveform superposed with a commutation spike of each phase in the form of sinusoidal wave until the next phase energization period ($S_V$_on) is started (in FIG. 3, the rise of the sinusoidal wave is partially visible in the open period 60 degrees). In particular, a portion of the open period enclosed by the elliptical broken line A in FIG. 3 corresponds to a commutation spike superposition period $D_{V+}$on. In the open period, the point at which the winding voltage waveform after the voltage-dividing intersects the zero-cross reference voltage Vzs is the zero-cross point Tvz.

When the U phase, the V phase, and the W phase have different winding voltage waveforms after the voltage-dividing, respectively, the description will be made about how the advance angle may become.

(1) When the U phase has the winding voltage waveform after the voltage-dividing similar to the waveform illustrated in FIG. 3, the advance angle becomes as follow. In a case where the winding voltage waveform illustrated in FIG. 3 is used as zero-cross detection timing, the zero-cross point (zero-cross point Tvz in FIG. 3) is not changed, and thus the advance angle is not changed.

(2) When the V phase has the winding voltage waveform after the voltage-dividing larger in voltage than the waveform illustrated in FIG. 3 (for example, 1.1 times the voltage in FIG. 3), the advance angle becomes as follow. In a case where the winding voltage waveform illustrated in FIG. 3 is used as a waveform having 1.1 times voltage at the zero-cross detection timing, the zero-cross point becomes faster than that in FIG. 3 (that is, since the winding voltage waveform becomes 1.1 times in voltage, the winding voltage waveform intersects more quickly the zero-cross reference voltage Vzs), and thus becomes an advance angle compared to the case of FIG. 3. For this reason, when the winding voltage waveform illustrated in FIG. 3 is used as a waveform having 1.1 times voltage at the zero-cross detection timing, the advance angle can be controlled without the change of the zero-cross reference voltage.

(3) When the W phase has the winding voltage waveform after the voltage-dividing smaller in voltage than the waveform illustrated in FIG. 3 (for example, 0.9 times the voltage in FIG. 3), the advance angle becomes as follow. In a case where the winding voltage waveform illustrated in FIG. 3 is used as a waveform having 0.9 times voltage at the zero-cross detection timing, the zero-cross point becomes slower than that in FIG. 3 (that is, since the winding voltage waveform becomes 0.9 times in voltage, the winding voltage waveform intersects more slowly the zero-cross reference voltage Vzs), and thus becomes an advance angle compared to the case of FIG. 3. For this reason, when the winding voltage waveform illustrated in FIG. 3 is used as a waveform having 0.9 times voltage at the zero-cross detection timing, the advance angle can be controlled without the change of the zero-cross reference voltage.

Accordingly, it is possible to perform the energization switching of the advance angle or the energization switching of the delay angle by applying to the sensorless driving control. For example, the zero-cross point defined in the above (1) is used at the time of start-up. In addition, the zero-cross point defined in the above (2) is used at the time of high speed. Furthermore, the zero-cross point defined in the above (3) is used at the time of low speed.

Figure 4:
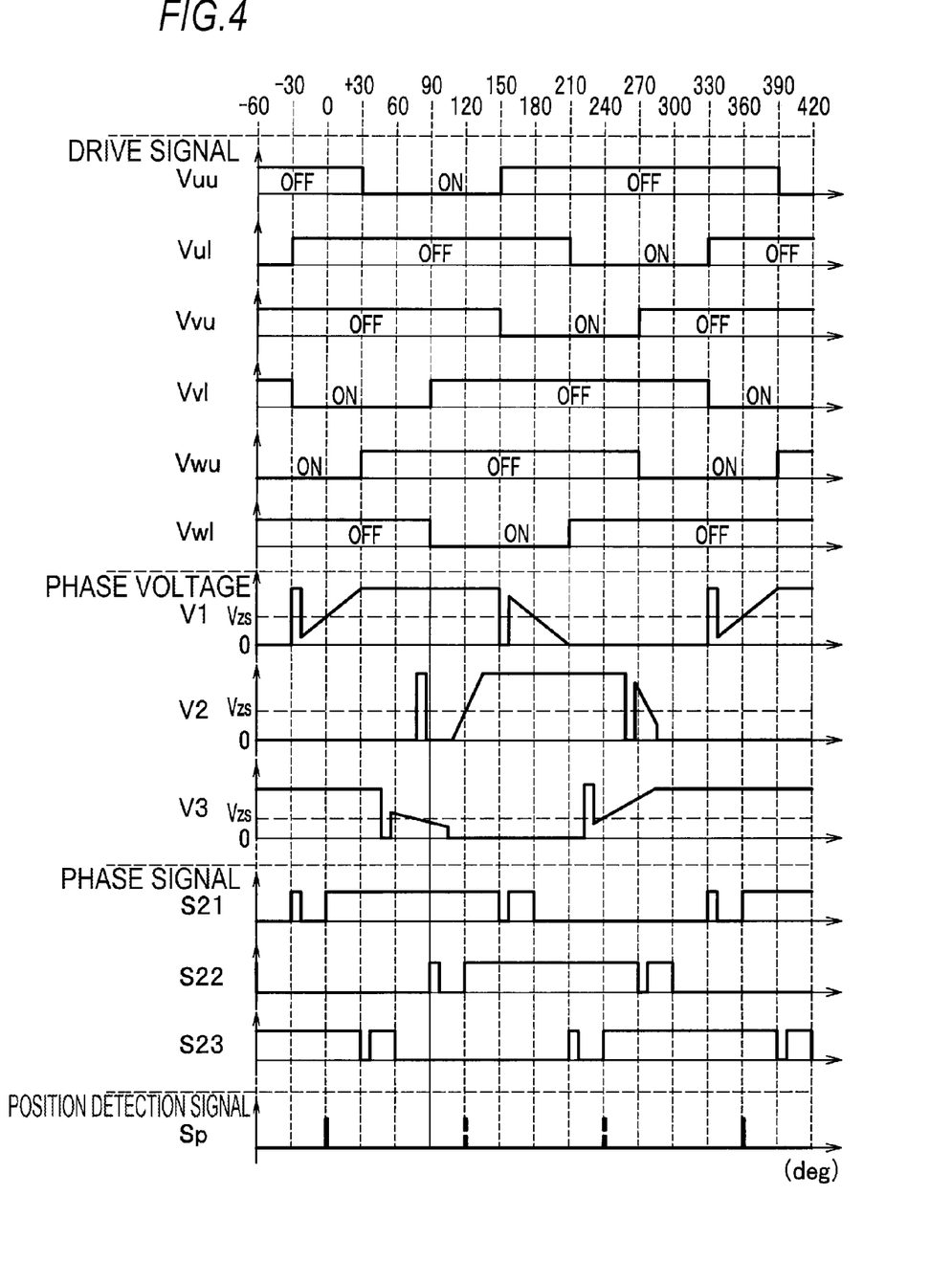
FIG. 4 is a timing chart illustrating an operation waveform of each unit of the motor drive control device according to the first embodiment.

FIG. 4 is a timing chart illustrating an operation waveform of each unit of the drive control device 1. For explanation, FIG. 4 illustrates an operation when advance angle adjustment on the zero-cross reference voltage Vzs is not performed.

In FIG. 4, respective graphs illustrate, from the top, waveforms of the drive signals Vuu to Vwl, the phase voltages V1 to V3, the phase signals S21 to S23, and the position detection signal Sp.

<Drive Signal>

The drive signal Vuu turns on the switching element Q1 at about 30 degrees, and turns off at about 150 degrees.

The drive signal Vul turns off the switching element Q2 at about −30 degrees, turns on at about 210 degrees, and turns off at about 330 degrees.

By turning-off of the drive signal Vul at about −30 degrees, the U phase is opened from the ground. A positive spike voltage is generated in the phase voltage V1. Thereafter, the phase voltage V1 rises to match with the zero-cross reference voltage Vzs at about 0 degrees, and is saturated at about 30 degrees.

By turning-on of the drive signal Vuu at about 30 degrees, the power supply voltage Vcc of the DC power source Vd is applied to the U-phase. The phase voltage V1 matches with the power supply voltage Vcc.

By turning-off of the drive signal Vuu at about 150 degrees, the U phase is opened from the positive electrode of the DC power source Vd. A negative spike voltage is generated in the phase voltage V1. Thereafter, the phase voltage V1 descends to match with the zero-cross reference voltage Vzs at about 180 degrees, and reaches 0 V at about 210 degrees.

By turning-on of the drive signal Vul at about 210 degrees, the U phase is electrically connected to the ground. The phase voltage V1 becomes 0 V.

<Phase Voltage>

In this embodiment, the U phase, the V phase, and the W phase have different winding voltage waveforms after the voltage-dividing, respectively. Specifically, the voltage-dividing ratio R1/R2 of the resistors R1 and R2 of the U phase, the voltage-dividing ratio R3/R4 of the resistors R3 and R4 of the V phase, and the voltage-dividing ratio R5/R6 of the resistors R5 and R6 of the W phase are different from one another, as illustrated in FIG. 1.

If the voltage-dividing ratio is changed, amplitude and peak value of the winding voltage waveform having the shape of the sinusoidal wave are changed. When the amplitude of the winding voltage waveform amplitude is changed, the detection of the zero cross is affected in the open period, for example, the zero-cross timing is advanced at the voltage-dividing ratio adjusted to increase the phase voltage. In addition, the zero-cross timing is delayed at the voltage-dividing ratio adjusted to lower the phase voltage.

The phase voltage V1 of the U phase indicated by the solid line in FIG. 4 is assumed to be normal.

The phase voltage V2 of the V phase is, for example, 1.1 times the voltage of the phase voltage V1 of the U phase as indicated by the solid line in FIG. 4. Accordingly, the timing where the phase voltage V2 exceeds the zero-cross reference voltage Vzs is further advanced (becomes the advance angle side).

The phase voltage V3 of the W phase is, for example, 0.9 times the voltage of the phase voltage V1 of the U phase as indicated by the solid line in FIG. 4. Accordingly, the timing where the phase voltage V3 exceeds the zero-cross reference voltage Vzs is further delayed (becomes the delay angle side).

<Phase Signal>

The phase signal S21 is generated through comparison between the phase voltage V1 and the zero-cross reference voltage Vzs.

At about −30 degrees, the phase signal S21 generates an H-level pulse which indicates a positive spike voltage, and is change from an L-level to the H-level at about 0 degrees. At about 150 degrees, the period of the phase signal S21 becomes an L-level by the negative spike voltage, and then is changed from the H-level to the L-level at about 180 degrees.

The drive signal Vvu turns on the switching element Q3 at about 150 degrees, and turns off at about 270 degrees.

The drive signal Vvl turns off the switching element Q4 at about 90 degrees, and turns on at about 330 degrees.

By turning-off of the drive signal Vvl at about 90 degrees, the V phase is opened from the ground. The positive spike voltage is generated in the phase voltage V2. Thereafter, the phase voltage V2 rises to match with the zero-cross reference voltage Vzs at about 120 degrees, and is saturated at about 150 degrees.

By turning-on of the drive signal Vvu at about 150 degrees, the power supply voltage Vcc of the DC power source Vd is applied to the V phase. The phase voltage V2 becomes the power supply voltage Vcc.

By turning-off of the drive signal Vvu at about 270 degrees, the V phase is opened from the positive electrode of the DC power source Vd. The negative spike voltage is generated in the phase voltage V2. Thereafter, the phase voltage V2 descends to match with the zero-cross reference voltage Vzs at about 300 degrees, and reaches 0 V at about 330 degrees.

By turning-on of the drive signal Vvl at about 330 degrees, the V phase is conductive to the ground. The phase voltage V2 becomes 0 V.

The phase signal S22 is generated through comparison between the phase voltage V2 and the zero-cross reference voltage Vzs.

The phase signal S22 generates an H-level pulse which indicates a positive spike voltage at about 90 degrees, and is changed from an L-level to the H-level at about 120 degrees. At about 270 degrees, the period of the phase signal S22 becomes the L-level by the negative spike voltage, and then is changed from the H-level to the L-level at about 300 degrees.

The drive signal Vwu turns off the switching element Q5 at about 30 degrees, and turns on at about 270 degrees.

The drive signal Vwl turns on the switching element Q6 at about 90 degrees, and turns off at about 210 degrees.

By turning-off of the drive signal Vwu at about 30 degrees, the W phase is opened from the positive electrode of the DC power source Vd. The negative the spike voltage is generated in the phase voltage V3. Thereafter, the phase voltage V3 descends to match with the zero-cross reference voltage Vzs at about 60 degrees, and reaches 0 V at about 90 degrees.

By turning-on of the drive signal Vwl at about 90 degrees, the W phase is conductive to the ground. The phase voltage V3 becomes 0 V.

By turning-off of the drive signal Vwl at about 210 degrees, the W phase is opened from the ground. The positive spike voltage is generated in the phase voltage V3. Thereafter, the phase voltage V3 rises to match with the zero-cross reference voltage Vzs at about 240 degrees, and is saturated at about 270 degrees.

By turning-on of the drive signal Vwu at about 270 degrees, the power supply voltage Vcc of the DC power source Vd is applied to the W phase. The phase voltage V3 matches with the power supply voltage Vcc.

The phase signal S23 is generated through comparison between the phase voltage V3 and the zero-cross reference voltage Vzs.

The phase signal S23 generates an L-level pulse which indicates the negative spike voltage at about 30 degrees, and is changed from an H-level to the L-level at about 60 degrees. At about 210 degrees, the period of the phase signal S23 becomes the H-level by the positive spike voltage, and then is changed from the L-level to the H-level at about 240 degrees.

<Position Detection Signal>

As illustrated in FIG. 4, the position detection signal Sp generates the positive H-level pulse at about 0 degrees, about 120 degrees, about 240 degrees, and about 360 degrees. When the positive spike voltage is generated in the phase voltages V1, V2, and V3, and then, the voltage rises to exceed the zero-cross reference voltage Vzs, the positive H-level pulse is generated in the position detection signal Sp.

<Selection of Position Detection Signal>

In this embodiment, the voltage-dividing ratio R1/R2 of the resistors R1 and R2 of the U phase, the voltage-dividing ratio R3/R4 of the resistors R3 and R4 of the V phase, and the voltage-dividing ratio R5/R6 of the resistors R5 and R6 of the W phase are different from one another, and thus three types of winding voltage waveforms after the voltage-dividing are generated. In the case of FIG. 4, since the U phase, the V phase, and the W phase have the phase voltages V1, V2, and V3, respectively, which are different, the detection of the zero-cross becomes fast or slow. Thus, it is possible to perform the energization switching of the advance angle or the energization switching of the delay angle.

For example, the position detection signal Sp indicated by the solid line in FIG. 4 is a position detection signal generated through comparison between the phase voltage V1 and the zero-cross reference voltage Vzs. The phase voltage V1 can be used as a zero-cross point at the time of the start-up. In this case, with respect to other phases (the V phase and the W phase), it is not necessary to detect the position detection signals Sp based on the phase voltages V2 and V3, respectively, and the position detection signal Sp detected from the phase voltage V1 is commonly used. The position detection signal Sp indicated by the broken line in FIG. 4 is an estimated position of the position detection signal Sp in the V phase and the W phase.

Figure 5:
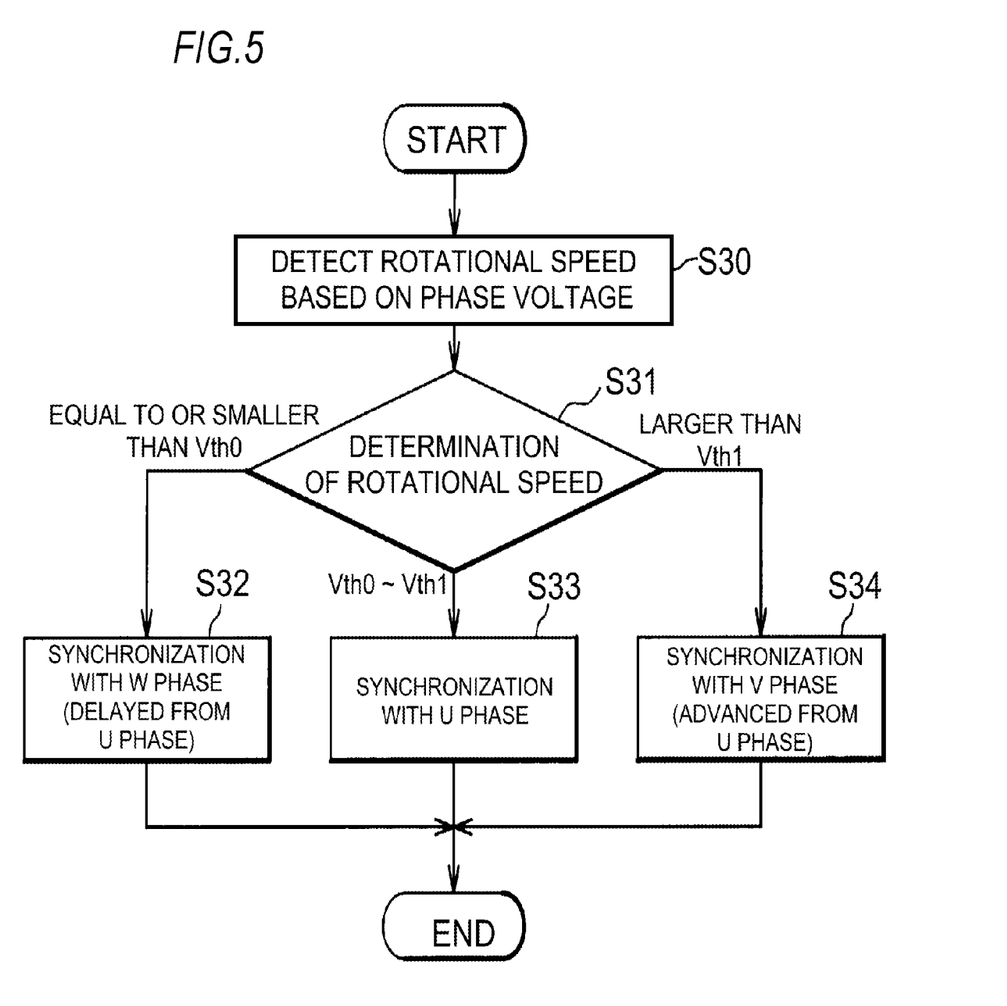
FIG. 5 is a flowchart illustrating a process of control to synchronize with a phase having an optimum advance angle depending on a rotational speed of the motor drive control device according to the first embodiment.

FIG. 5 is a flowchart illustrating a process of control to synchronize with the phase with the optimum advance angle depending on the rotational speed.

The advance angle control illustrated in FIG. 5 is executed by the controller 4 of the drive control device 1.

In step S30, the rotational speed determination unit 41 (see FIG. 1) of the controller 4 detects the rotational speed of the rotor based on the phase voltage.

In step S31, the rotational speed determination unit 41 determines the detected rotational speed. When the detected rotational speed is equal to or smaller than a first determination speed threshold value Vth0 (equal to or less than Vth0), the process proceeds to step S32. When the detected rotational speed is larger than the first determination speed threshold value Vth0 and equal to or smaller than a second determination speed threshold value Vth1 (only Vth0<Vth1) (from Vth0 to Vth1), the process proceeds to step S33. When the detected rotational speed is larger than the second determination speed threshold value Vth1 (larger than Vth1), the process proceeds to step S34.

A case where the detected rotational speed is equal to or smaller than the first determination speed threshold value Vth0 is a case of a predetermined low speed. In this case, the controller 4 controls to synchronize with the W phase delayed from the U phase in step S32, and the process of FIG. 5 is completed. In order to control to synchronize with the W phase delayed from the U phase, specifically, the selection circuit 43 of the controller 4 selects the phase signal S23 generated by the zero-cross point, based on the phase voltage V3 of the W phase, and outputs the phase signal S23 as the selection signal S5 to the energization signal generator 42.

A case where the detected rotational speed is larger than the first determination speed threshold value Vth0 and equal to or smaller than the second determination speed threshold value Vth1 is a case of a normal operation. In this case, the controller 4 controls to synchronize with the U phase, which is not adjusted to be advanced or delayed, in step S33, and the process of FIG. 5 is completed. Specifically, the selection circuit 43 of the controller 4 selects the phase signal S21 generated by the zero-cross point, based on the phase voltage V1 of the U phase, and outputs the phase signal S21 as the selection signal S5 to the energization signal generator 42.

A case where the detected rotational speed is larger than the second determination speed threshold value Vth1 is a case of a predetermined high speed. In this case, the controller 4 controls to synchronize with the V phase advanced from the U phase in step S33, and the process of FIG. 5 is completed. In order to control to synchronize with the V phase advanced from the U phase, specifically, the selection circuit 43 of the controller 4 selects the phase signal S22 generated by the zero-cross point, based on the phase voltage V2 of the V phase, and outputs the phase signal S22 as the selection signal S5 to the energization signal generator 42.

According to this control, the drive control device 1 of the motor 20 can perform the control to synchronize with the phase having the optimum advance angle depending on the rotational speed. Thus, it is possible to realize the low-speed rotation without occurrence of the step-out.

As described above, the drive control device 1 of the motor 20 of this embodiment includes: the back-electromotive-voltage detector 7 that has the resistive voltage dividing circuits having respectively the voltage-dividing ratios (R1/R2, R3/R4, and R5/R6) of the respective phases; and the controller 4 that performs the sensorless driving based on the detected rotational position of the rotor and controls to synchronize with the phase having the optimum advance angle depending on the rotational speed. The controller 4 includes: the back-electromotive-voltage comparator 5 which generates the phase signals of the respective phases due to the cross timing of the zero-cross reference voltage Vzs and the back electromotive voltage of the each phase coil; the rotational speed determination unit 41 which inputs the phase signals of the respective phases and outputs rotational speed information S4; the selection circuit 43 which selects and outputs any one of the phase signals of the respective phases depending on the rotational speed information S4; and the energization signal generator 42 which generates the drive control signal Sc based on a selection signal S5 output from a selection circuit 43.

With such a configuration, the drive control device 1 can generate three types of back electromotive voltage waveforms after the voltage-dividing of the respective phases. For example, in the case of the three-phase motor, it is possible to make three types of back electromotive voltage waveforms after the voltage-dividing of the respective phases. Therefore, the back-electromotive-voltage comparator 5 can detect the zero-cross at the advance angle side or the delay angle side, and can perform the energization switching of the advance angle or the energization switching of the delay angle without the change of the zero-cross reference voltage Vzs. For example, the synchronization is performed with respect to the phase having the advance angle suitable for the start-up at the time of the start-up, the synchronization is performed with respect to the phase having the advance angle suitable for the high-speed rotation at the time of the high-speed rotation, and the synchronization is performed with respect to the phase having the delay angle suitable for the low-speed rotation at the time of the low-speed rotation. In this way, it is possible to normally start up and, and the step-out hardly occurs even at the high speed or the lower speed, compared to the existing sensorless driving. As a result, it is possible to realize the drive control device 1 that does not cause the step-out even both at the high-speed rotation and the low-speed rotation while starting up in normal.

According to the embodiment, the following effects can be obtained.

(1) Since the control can be performed to synchronize with the phase having the optimum advance angle depending on the rotational speed, the step-out does not occur. That is, by the synchronization with the phase (BEMF) suitable for the high-speed rotation, the step-out hardly occurs even at the high-speed rotation. Further, since the start-up is also stable as usual, there is no adverse effect.

(2) Since multiple advance angle patterns (three patterns in a case of the three phases) can be prepared, it is possible to synchronize with the appropriate phase depending on the rotational speed and improve efficiency. In this embodiment, the advance angles can have three stages, and thus it is possible to synchronize with the appropriate phase (BEMF) in response to the number of revolutions and improve efficiency.

(3) The resistive voltage dividing circuit of the specified phase is set to the voltage-dividing ratio suitable for the low-speed rotation, the synchronization is performed with the corresponding phase at the time of the low-speed rotation, and thus the low-speed rotation can be realized. In other words, it is also possible to realize the low-speed rotation by the synchronization with the phase (BEMF) suitable for the low-speed rotation.

Modification Example

This disclosure is not limited to the above-described embodiments, and may be modified without departing from the spirit and scope of this disclosure, for example, as following (a) to (h).

(a) The switching of the phase to be synchronized in the above-described embodiments is not limited to the actual rotational speed, and may be determined based on winding voltage, winding current, the combination thereof, and the like. Accordingly, the switching can be performed at an optimum timing.

(b) At least some portions of components of the drive control device 1 may be processed not by hardware, but by software.

(c) The motor 20 is not limited to a three-phase brushless motor, and may be another kind of motor. The number of phases of the motor 20 is not limited to three.

(d) The driving system of the motor 20 is not limited to the sinusoidal wave driving system, and may be a rectangular wave driving system, for example.

(e) At least some portion of the drive control device 1 may be an integrated circuit (IC).

(f) The circuit block configuration of the selection circuit 43 illustrated in FIG. 2 is merely a specific example, and is not limited thereto.

(g) The control sequence illustrated in FIG. 5 is merely an example, and is not limited to these process steps. For example, another process may be inserted between the steps.

(h) The predetermined zero-cross reference voltage Vzs corresponding to each rotational speed of the motor 20 is set to an appropriate value based on, for example, a theory and the actual measurement result, and then may be stored in a storage unit (not illustrated). The value of the zero-cross reference voltage Vzs corresponding to each rotational speed of the motor 20 may be stored in the storage unit.

What is claimed is:

1. A motor drive control device that drives a motor including a plurality of phase coils and a rotor rotatably supported with respect to the plurality of phase coils, the motor drive control device comprising:
   a controller, which generates a drive control signal;
   a motor driver, which outputs a drive signal to each of the phase coils of the motor, based on the drive control signal;
   a back-electromotive-voltage detector, which is connected to each of the phase coils and includes resistive voltage dividing circuits having respectively different voltage-dividing ratios, wherein the back-electromotive-voltage detector detects a rotational position of a rotor for sensorless driving by using the resistive voltage dividing circuits;
   wherein the controller includes:
   a back-electromotive-voltage comparator, which generates phase signals of respective phases due to cross timing of a zero-cross reference voltage and a back electromotive voltage of the each of the phase coils;
   a rotational speed determination unit, which inputs the phase signals of the respective phases and outputs rotational speed information;
   a selection circuit, which selects and outputs any one of the phase signals of the respective phases depending on the rotational speed information; and
   an energization signal generator, which generates the drive control signal based on the phase signal output from the selection circuit.

2. The motor drive control device according to claim 1, wherein the controller performs the sensorless driving based on the rotational position of the rotor detected by the back-electromotive-voltage detector, and
   wherein the controller performs control to synchronize with a phase having an optimum advance angle depending on a rotational speed of the motor.

3. The motor drive control device according to claim 2, wherein the controller switches the phase, which is to be synchronized, to a further advanced angle, as the rotational speed is increased.

4. The motor drive control device according to claim 2, wherein the controller determines the rotational speed based on at least one of a winding voltage and a winding current of each of the phase coils.

* * * * *